US009363366B1

(12) United States Patent
Seetharaman et al.

(10) Patent No.: US 9,363,366 B1
(45) Date of Patent: Jun. 7, 2016

(54) SYSTEM AND METHOD FOR IMPROVED LAWFUL INTERCEPTIONS FOR CALLS INVOLVING IN-BAND DTMF SIGNALING

(71) Applicants: Swaminathan Seetharaman, Chennai (IN); Venkata Subramanian Jayaraman, Chennai (IN)

(72) Inventors: Swaminathan Seetharaman, Chennai (IN); Venkata Subramanian Jayaraman, Chennai (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/672,164

(22) Filed: Mar. 28, 2015

(30) Foreign Application Priority Data

Feb. 13, 2015 (IN) .............................. 724/CHE/2015

(51) Int. Cl.
*H04M 1/24* (2006.01)
*H04M 3/08* (2006.01)
*H04M 3/22* (2006.01)
*H04M 3/42* (2006.01)

(52) U.S. Cl.
CPC ........ *H04M 3/2281* (2013.01); *H04M 3/42068* (2013.01)

(58) Field of Classification Search
CPC .......... H04M 2207/12; H04M 3/2281; H04M 7/006; H04L 63/00; H04L 63/30; H04L 63/306; H04L 65/1006; H04L 65/1079; H04L 12/24; H04L 41/00; H04L 29/06; H04L 29/06027
USPC ........... 379/32.01, 32.03, 35, 114.15, 114.17, 379/114.19, 114.2, 142.18, 245, 283, 32.05, 379/112.01
See application file for complete search history.

(56) References Cited

U.S. PATENT DOCUMENTS

| | | | | |
|---|---|---|---|---|
| 5,442,696 | A * | 8/1995 | Lindberg | H04Q 1/4575 340/13.33 |
| 7,283,521 | B1 * | 10/2007 | Ryan | H04L 63/306 370/230 |
| 8,031,708 | B2 | 10/2011 | Lu et al. | |
| 8,271,049 | B2 | 9/2012 | Silver et al. | |
| 9,179,202 | B1 * | 11/2015 | Su | H04Q 1/45 |
| 2004/0202295 | A1 * | 10/2004 | Shen | H04L 29/06 379/112.01 |
| 2008/0095342 | A1 * | 4/2008 | Imbimbo | H04L 63/00 379/112.01 |
| 2009/0074159 | A1 * | 3/2009 | Goldfarb | H04M 1/247 379/88.13 |

OTHER PUBLICATIONS

Series H: Audiovisual and Multimedia Systems; Infrastructure of Audiovisual Services—Communication Procedures. Gateway Control Protocol: Version 3. ITU-T H.248.1, Mar. 2013 (242 pages).
Series H: Audiovisual and Multimedia Systems; Infrastructure of Audiovisual Services—Communication Procedures. Gateway Control Protocol: Enhanced Digit Collection Packages and Procedures. ITU-T H.248.16, Mar. 2013 (18 pages).

* cited by examiner

*Primary Examiner* — Binh Tieu
(74) *Attorney, Agent, or Firm* — Finnegan, Henderson, Farabow, Garrett & Dunner, L.L.P.

(57) ABSTRACT

This disclosure relates generally to call interception techniques, and more particularly to systems and methods for improved lawful interceptions for calls involving in-band DTMF signaling. In one embodiment, a method for implementing in-band dual-tone multi-frequency call interception is disclosed. The method may include receiving a call intercept request for a target user number at a soft switch. The method may also include initiating, by one or more processors, call monitoring of a call from a calling user to a call proxy system to capture in-band dual-tone multi-frequency signaling. Further, the method may include determining whether the dual-tone multi-frequency signaling corresponds to the target user number.

17 Claims, 4 Drawing Sheets

SYSTEM AND METHOD FOR IMPROVED LAWFUL INTERCEPTIONS FOR CALLS INVOLVING IN-BAND DTMF SIGNALING

PRIORITY CLAIM

This U.S. patent application claims priority under 35 U.S.C. §119 to Indian Application No. 724/CHE/2015, filed on Feb. 13, 2015. The aforementioned application is incorporated herein by reference in its entirety.

TECHNICAL FIELD

This disclosure relates generally to call interception techniques, and more particularly to systems and methods for improved lawful interceptions for calls involving in-band DTMF signaling.

BACKGROUND

Digital communication has revolutionized telephone networks. One particular aspect, Voice over Internet Protocol (VoIP), has provided increased efficiency and quality for real-time voice communications. VoIP utilizes protocols to initiate and control call parameters. For example, Session Initiation Protocol (SIP) is an application-layer protocol that is used to set up VoIP phone calls. SIP INVITE messages may indicate contact information to initiate a call to a called user. Other types of SIP messages may be used to query capabilities or match codecs for a VoIP call.

As telephone technology has advanced, telephonic surveillance techniques have also changed. Rather than placing a monitoring device on a particular phone handset, a gateway may monitor VoIP call messages at the core of the packet network. Existing VoIP surveillance techniques rely on intercepting SIP messages that identify a calling party or a caller party. For example, an SIP INVITE message may include the IP address of a called user.

SUMMARY

In one embodiment, a method for implementing in-band dual-tone multi-frequency (DTMF) call interception is disclosed. The method may include receiving a call intercept request for a target user number at a soft switch. The method may also include initiating, by one or more processors, call monitoring of a call from a calling user to a call proxy system to capture in-band dual-tone multi-frequency signaling. Further, the method may include determining whether the dual-tone multi-frequency signaling corresponds to the target user number.

In another embodiment, a method for implementing proxy call interception is disclosed. The method may include receiving a call intercept request for a target user number at a soft switch. The method may further include initiating, by one or more processors, call monitoring of a call from a calling user to a call proxy system to capture signaling plane data. The method may include determining whether the signaling plane data corresponds to the target user number.

In another embodiment, a method for implementing in-band dual-tone multi-frequency call interception is disclosed. The method may include receiving a call intercept request for a target user number at a soft switch. The method may include sending, by one or more processors, to a neighboring media gateway controller, a request for call monitoring of a call from a calling user to a call proxy system to capture in-band dual-tone multi-frequency signaling. The method may further include receiving, by the one or more processors, from the neighboring media gateway controller, the in-band multi-frequency signaling. Additionally, the method may include determining whether the dual-tone multi-frequency signaling corresponds to the target user number.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

A law enforcement agency (LEA) may provide a request and/or authorization for a lawful interception (LI) of calls involving a target user. A LEA may be a government organization. Example LEAs include local, state, national, and international agencies that may monitor and track criminal activities or protect national interests. An LEA LI may require approval from another entity. For example, a city police department may need approval from the judiciary (e.g., a judge) in order to approve an LI. In other embodiments, an LEA may include a quasi-governmental entity or a private investigator.

Simply monitoring the calls made by the target user may not capture all calls involving the target user. Users may place calls to the target user using a call proxy system. For example, a user may dial an automated call proxy system and enter the target user number. The call proxy system may then place a call to the target user number and connect the caller to the target user. Example call proxy systems may include, for example, calling card systems, reverse charge calling systems (e.g., collect calling systems), operator-assisted call systems, automated operator service systems, and Home Country Direct call services. Other call proxy systems may be used, such that they allow a call to eventually be made to a user without placing the initial call to the user.

With regard to call proxy systems, some call interception processes may be limited because, for example, they may rely on explicit protocol signaling messages to indicate the called user. Hence, if the called user contact information in a signaling message matches a target identifier, the call may be recorded by a network device. However, when a call is placed to a call proxy system, which in turn connects the caller with the target user, the protocol signaling messages may not indicate that the caller is being connected to the target user.

Embodiments of this disclosure may use in-band call signaling, such as in-band DTMF signaling, to determine that a user is placing a call to a target user. When interacting with a call proxy system, in-band signaling corresponding to the target user, such as DTMF digits, may be sent from the caller to the call proxy system. By monitoring in-band signaling of calls, the embodiments of the disclosure may determine whether the caller is being connected to a target user, even though the initial call is not placed to the target user.

Illustrative embodiments of the present disclosure are listed below. In one embodiment, in-band DTMF call interception systems are described. In another embodiment, in-band DTMF signaling call interception processes is described. In an embodiment, a computer system is disclosed which may carry out disclosed processes. The disclosed systems and processes may be used in conjunction or applied separately without limitation.

Figure 1:
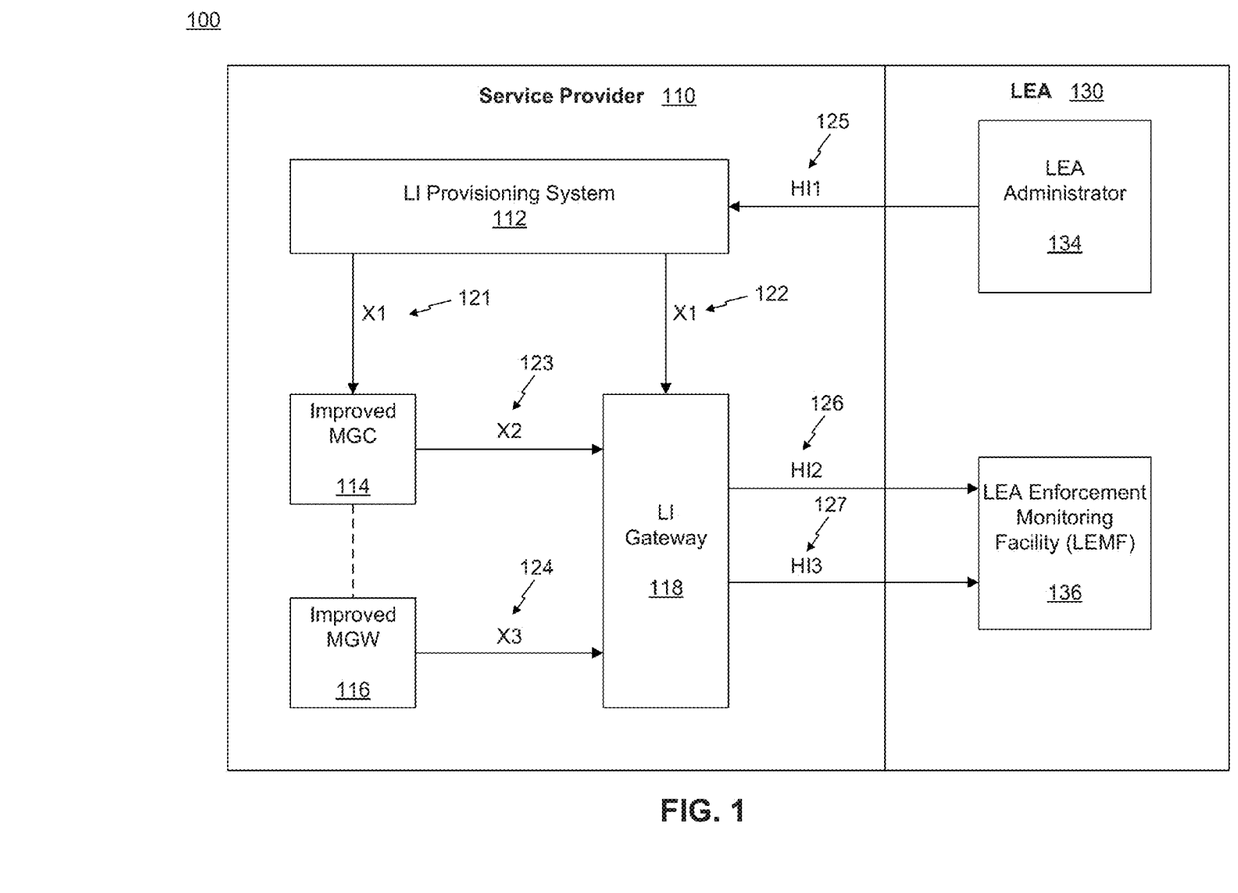
FIG. 1 illustrates an exemplary system for improved lawful interceptions for calls involving in-band DTMF signaling according to some embodiments of the present disclosure.

FIG. 1 illustrates an exemplary system for improved lawful interceptions for calls involving in-band DTMF signaling according to some embodiments of the present disclosure. System 100 may include service provider 110 and LEA 130.

In an embodiment, LEA 130 may include LEA administrator 134. LEA administrator may be a computerized interface to receive user input. In other embodiments, LEA administrator 134 may be an automated server, such as a networked hardware server, which may process call intercept requests without human intervention.

LEA administrator 134 may provide call intercept information to service provider 110. In an embodiment, LEA administrator 134 may provide an LI action to LI provisioning system 112 using HI1 interface 125. For example, LEA administrator may transmit an identifier of a target identifier, such as a telephone number or IP address. LEA administrator may further indicate additional details for the LI action. For example, the LI action may indicate an expiration for the LI action, multiple target identifiers, preferred monitoring data (e.g., particular formats for LI information), types of channels to monitor, and whether to use in-band DTMF analysis. These details may allow LEA 130 to specify LI actions that comply with local and national laws regarding surveillance and call monitoring.

In an embodiment, LEA 130 may include LEA enforcement monitoring facility (LEMF) 136. LEMF 136 may receive LI data from service provider 110. In an embodiment, LEMF 136 may receive information from LI gateway 118 using HI2 interface 126 or HI3 interface 127. For example, HI2 interface 126 may include call detail information, such as timing, numbers, and DTMF data. LEMF 136 may receive media content (e.g., voice, video, data, fax) from LI gateway 118 using HI3 interface 127. LEMF 136 may store and provide LI information to networks, device, and users of LEA 130. For example, LEMF 136 may receive requests from networked device for specific LI information. LEMF 136 may provide requested detail information or media content to the networked device.

While LEA administrator 134 and LEMF 136 are depicted as part of LEA 130, it is to be understood that LEA administrator 134 and LEMF 136 may not be physically located at a law enforcement agency. In some embodiments, LEA administrator and LEMF 136 may be located at different secure sites, such as secured information facilities. In an embodiment, LEA administrator 134 and LEMF 136 may not be collocated. For example, LEA administrator 134 may be located at a different location than LEMF 136.

In an embodiment, service provider 110 may include LI provisioning system 112. LI provisioning system 112 may receive call intercept requests. For example, LI provisioning system may receive call intercept requests (e.g., "LI requests" or "LI actions") from LEA 130. In an embodiment, the call intercept requests may include an identifier corresponding to a target user. For example, the call intercept may include the IP address, telephone number, MAC address, or email address of a person whose calls should be intercepted. LI provisioning system 112 may transmit messages to improved MGC 114 and LI gateway 118 based on the call intercept requests. For example, LI provisioning system 112 may transmit the target user identifier, such as a telephone number, to improved MGC 114 over X1 interface 121 with an instruction to monitor in-band signaling for the target user identifier. LI provisioning system 112 may also transmit information and instructions to LI gateway 118 over X1 interface 122.

In an embodiment, service provider 110 may include at least one media gateway (MGW) and media gateway controller (MGC). As depicted, service provider 110 includes improved MGC 114 and improved MGW 116. The improved MGC 114 and improved MGW 116 may provide standard gateway controller and gateway functionality, respectively. They may also perform DTMF detection. For example, improved MGW 116 may monitor the information being transferred in the media path, such as DTMF tones that occur during DTMF digit dialing.

Improved MGW 116 may send improved notifications to improved MGC 114. The notification may be improved in that it may aid improved MGC 114 in determining if DTMF signaling contains a target identifier. For example, improved MGW 116 may transmit improved notifications that include DTMF tones captured from in-band signaling. The improved notifications may also indicate the intent and purpose of the in-band DTMF signals.

In an embodiment, service provider 110 may include LI gateway 118. LI gateway may receive information from improved MGC 114 and improved MGW 116. For example, improved MGC 114 may provide call detail information over X2 interface 123, while improved MGW 116 may provide media content (e.g., voice, video, data, fax) over X3 interface 124.

LI gateway 118 may perform transcoding processes. In an embodiment, LI gateway 118 may reformat data received from improved MGC 114 and improved MGW 116 prior to sending the data to LEMF 136. LI gateway 118 may transcode data to a particular format. For example, LI gateway 118 may convert captured audio from to a particular file format or compress video. In an embodiment, the LI action received from LEA administrator 134 may include specific formatting requirements for data. LI provisioning system 112 may transmit these requirements to LI gateway over X1 interface 122. The formatting requirements may specify, for example, file formats, bit rates, file size limits, resolution requirements, and image types.

Figure 2:
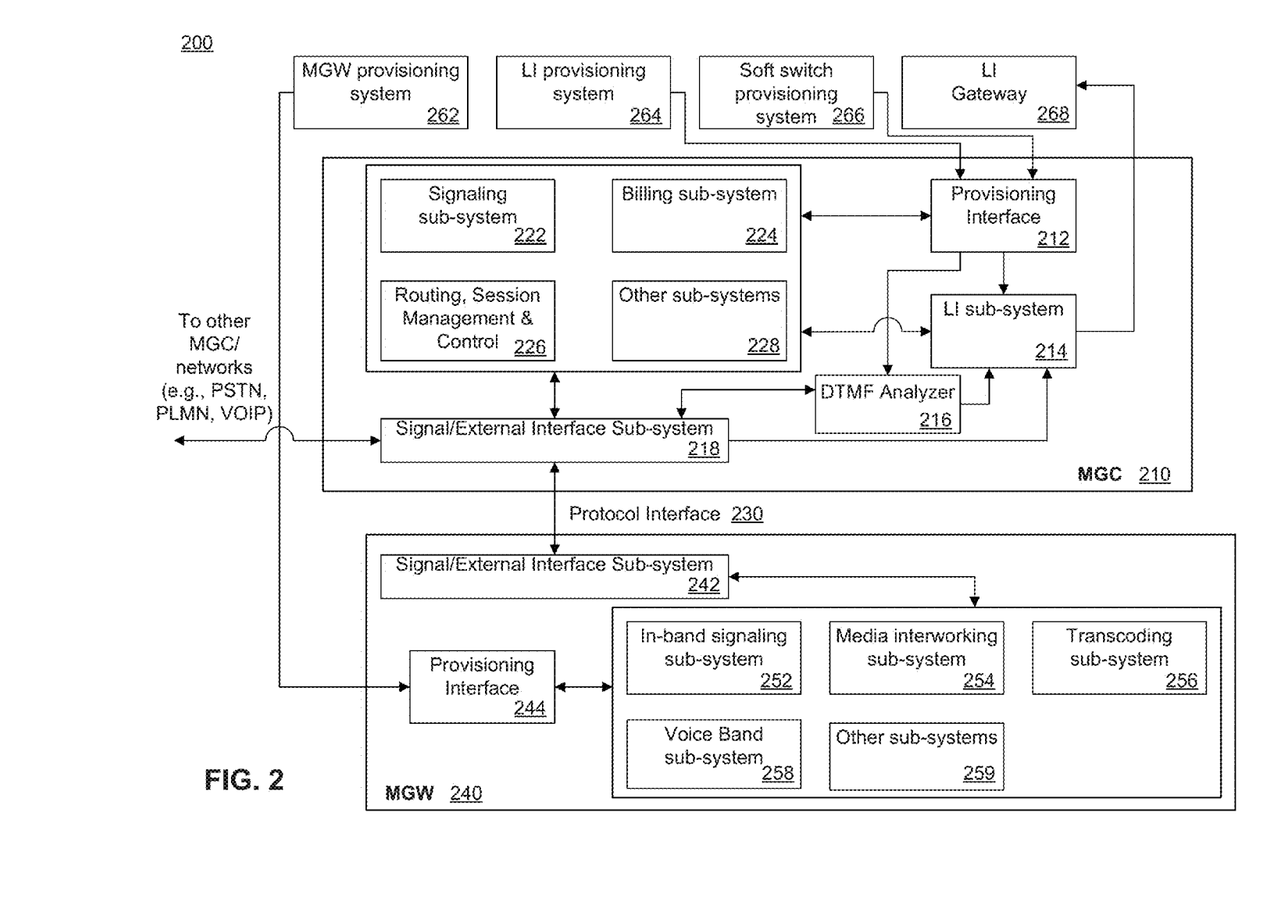
FIG. 2 is a functional block diagram according to some embodiments of the present disclosure.

FIG. 2 is a functional block diagram according to some embodiments of the present disclosure. System 200 may be implemented as part of system 100. System 200 includes MGC 210 and MGW 240. MGC 210 and MGW 240 are modified from standard media gateways and gateway controllers to accommodate in-band DTMF processing.

In an embodiment, MGC 210 may include various sub-systems to perform the objects of this disclosure. As depicted, MGC 210 may include provisioning interface 212, LI sub-system 214, signaling sub-system 222, billing sub-system 224, routing, session management, & control (RSMC) 226, other sub-systems 228, DTMF analyzer 216, and signal/external interface sub-system (SEIS) 218. Additional sub-systems may be used to perform disclosed processes. These sub-systems may be discrete units or combined into fewer separate sub-systems. The sub-systems may be made of discrete circuitry or processors, or programmable applications which run on hardware.

Provisioning interface 212 may interact with the external provisioning systems, such as element management systems (EMS) and network management systems (NMS). In an embodiment, provisioning interface 212 may communicate with LI provisioning system 264 and soft switch provisioning system 266. Provisioning interface 212 may make updates to copies of provisioned data in MGC 210 and may pass information to the necessary sub-systems, so that the provisioned data may be used by different sub-systems.

In an embodiment, provisioning interface 212 may interact with LEA systems. Provisioning interface 212 may obtain input from a LI gateway using, for example, an LEA interface. The input may describe the specific actions to be taken by MGC 210 when a potential false trigger for LI initiation for a call. For example, provisioning interface may Initiate a LI even if the digits are dialed as DTMF beyond normal inter-digit timer values, but within a specified threshold. The caller may dial digits slowly, such that normal dialing systems may timeout. However, provisioning interface 212 may include predefined inter-digit timers that extend beyond standard inter-digit intervals. In another example, provisioning interface may receiving instructions to Initiate a LI when an analysis of in-band DTMF data indicates a confidence level of greater than 90% that the call involves an LI target. Further example instructions include, sending information only over an X2 interface (e.g., not sending any information over an X3 interface) when an analysis indicates a confidence level of more than 80% that a call involves an LI target. In this example, MGC 210 may send only signaling information for the call, rather than media contents (e.g, voice and video).

DTMF analyzer 216 may process DTMF data. In an embodiment, DTMF analyzer may determine whether in-band data includes a target identifier. For example, DTMF analyzer 216 may obtain input regarding DTMF digits that may be reported by MGW 240. DTMF analyzer 216 may perform an analysis based on the DTMF input. The DTMF input may include, for example, digit sequences, the user who sent the digits, whether the user is a calling users or a called user, and inter-digit intervals for the DTMF data. During the analysis, the DTMF analyzer 216 may dynamically adapt the inter-digit interval threshold and the threshold interval between the tone and the start of the dual-tone multi-frequency signaling is dynamically adapted based on for example, distance of the calling user from the media gateway, distance of the call proxy system from the media gateway, and congestion level of a path in the network over which media content for the call is transported The DTMF analyzer 216 may determine the confidence level that the call involves an LI target based on the analysis aforementioned, and also taking into consideration historical data of calls involving the specific calling/called user. DTMF analyzer 216 may reference instructions associated with an LI to determine actions to perform in case of potential false trigger for LI initiation for a call. In an embodiment, DTMF analyzer 216 may utilize the DTMF data to trigger LI sub-system 214 to initiate an LI for a particular call. DTMF analyzer 216 may, based on the analysis, transmit instructions to LI sub-system 214 to send additional info to LI gateway 268. For example, DTMF analyzer may send instructions to LI sub-system 214 to format DTMF information into a format that the LEA can understand.

LI sub-system 214 may process LI actions from an LEA, such as LEA 130. In an embodiment, LI sub-system may carry out all LI-related actions in MGC 210. LI sub-system 214 may interface with the LEA (e.g., via LI gateway 268). LI sub-system may provide signalling information for an LEA, for example, through LI gateway 268 over an X2 interface. LI sub-system may initiate media content duplication and transport to an LEA. In an embodiment, LI sub-system 214 may receive input from DTMF analyzer 216. For example, DTMF analyzer 216 may provide information necessary to initiate a LI for a call and/or report additional information to LI gateway 268.

SEIS 218 may process communication with external systems for MGC 210. In an embodiment, SEIS 218 may handle protocol messages, associated signalling state machines, and interactions with MGW 240, and transmissions from other networks (e.g., PSTN, PLMN, VOIP, IMS, etc.). For example, SEIS 218 may send and receive LI information to manage ongoing intercepts. SEIS 218 may send information present in an enriched notification from MGW 240 using protocol interface 230. The enriched notification may include DTMF digits and inter-digit. SEIS 218 may forward the enriched notification to DTMF analyzer 216. SEIS 218 may send information present in an enriched signalling message received from a neighbouring node on a signalling path towards DTMF analyzer 216 within the MGC 210. For example, SEIS may process enriched SIP INFO messages to forward information to DTMF analyzer 216.

Signaling sub-system 222 may manage signaling protocol process for MGC 210. For example, signaling sub-system 222 may monitor and control signaling state machines and protocol function handling for various call-setup signalling interfaces to other MGCs and SIP nodes and networks (e.g., PSTN, PLMN). RSMC 226 may perform call control processes. In an embodiment, RSMC 226 may be responsible for set-up and tear-down of a call session. RSMC may control routing of the call to the proper destination and triggering other sub-systems, such as billing sub-system 224. Billing sub-system 224 may provide billing services. process charges associated with call services. In an embodiment, billing sub-system may process call charges. For example, billing sub-system 224 may collect information, such as Call Data Records, and transport the call data records to a business support sub-system (BSS) periodically over standard or proprietary interfaces. Other sub-systems 228 may represent other sub-systems that may be present in MGC 210. These sub-systems may not be used in disclosed processes.

System 200 may include MGW 240. In an embodiment, MGW 240 may include various sub-system for implementing disclosed processes. As depicted, MGW may include SEIS 242, provisioning interface 244, in-band signaling sub-system (IBSS) 252, media interworking sub-system 254, transcoding sub-system 256, voice band sub-system (VBS) 258, and other sub-systems 259. Additional sub-systems may be used to perform disclosed processes. These sub-systems may be discrete units or combined into fewer separate sub-systems. The sub-systems may be made of discrete circuitry or processors, or programmable applications which run on hardware.

Provisioning interface 244 may provide provisioned data to sub-systems of MGW 240. In an embodiment, provisioning interface 244 may interact with MGW provisioning system 262 to update provisioned data. For example, provisioning interface 244 may update copies of provisioned data in MGW 240 and pass information to the necessary sub-systems, so that the provisioned data may be used by different sub-systems.

SEIS 242 may process communication with external systems for MGW 240. In an embodiment, SEIS 242 may handle protocol messages, associated signalling state machines, and interactions with MGC 210. For example, SEIS 242 may track states for SIP messaging. In an embodiment, SEIS 242 may interpret triggers from MGC 210. The triggers may allow SEIS to provide improved detection and notification of DTMF information. SEIS 242 may provide the DTMF information to IBSS 252 and VBS 258 for processing. In an embodiment, SEIS 242 may aggregate and sequence the information received from IBSS 252 and VBS 258. SEIS 242 may send this sequence information over protocol interface 230 to MGC 210. For example, SEIS 242 may utilize improved form of NOTIFY messages to indicate a series of DTMF digits, an announcement, or a combination thereof. For example, SEIS 242 may transmit five DTMF digits, an announcement for 10 seconds, and three additional DTMF digits.

Media interworking sub-system 254 may translate media between networks. In an embodiment, MGW 240 may receive media from various networks, such as PSTN and IP networks. Media interworking sub-system 254 may interwork media between different networks. For example, media interworking sub-system 254 may interwork media between a PSTN network (e.g., E1/T1 connections) and an IP network (e.g., RTP); between two PSTN networks (e.g., PSTN hairpinning); and/or between two IP networks (e.g., IP hairpinning).

Transcoding sub-system 256 may handle codecs for MGW 240. In an embodiment, transcoding sub-system 256 may work with media interworking sub-system 254. For example, transcoding sub-system 256 may provide the codecs necessary to transcode media for two different networks.

IBSS 252 may provide in-band signaling operations. In an embodiment, IBSS 252 may detect DTMF digits and multi-frequency tones. For example, IBSS 252 may process incoming audio data to identify DTMF digits in captured audio. IBSS 252 may also collect digits and perform digit pulsing. In an embodiment, IBSS 252 may also handle the generation of specialized packet formats to indicate DTMF digits. For example, IBSS 252 may identify DTMF tones in audio and generate packets compliant with RFC 2833, a format for transporting DTMF tones in packets. In an embodiment, IBSS 252 may detect and store DTMF information. IBSS may record inter-digit intervals, timestamps of each digit dialed, and a duration of each tone, for example. Using this information, IBSS 252 may determine digit spacing, such as which digits are dialed in close series. IBSS 252 may pass the DTMF information to SEIS 242 for improved notification to MGC 210.

VBS 258 may provide functions to process voice audio. In an embodiment, VBS 258 may receive audio data including voices. VBS 258 may perform echo cancellation, jitter handling, fax transmission processing (e.g., T.38, voice-band fax), media inactivity detection, and comfort noise generation. For example, during a call, VBS 258 may generate a comfort tone for a caller and remove background noise. In an embodiment, VBS 258 may provide in-band voice analysis for DTMF dialing. VBS 258 may monitor media activity during the period of DTMF dialing. For example, VBS 258 may determine whether an announcement is being played during DTMF dialing. VBS 258 may provide resulting information to SEIS 242 to send to MGC 210.

Other sub-systems 228 may represent other sub-systems that may be present in MGC 210. These sub-systems may or may not be used in disclosed processes. System 200 may include additional interfaces and network connections (not depicted) to interface with different networks.

Figure 3:
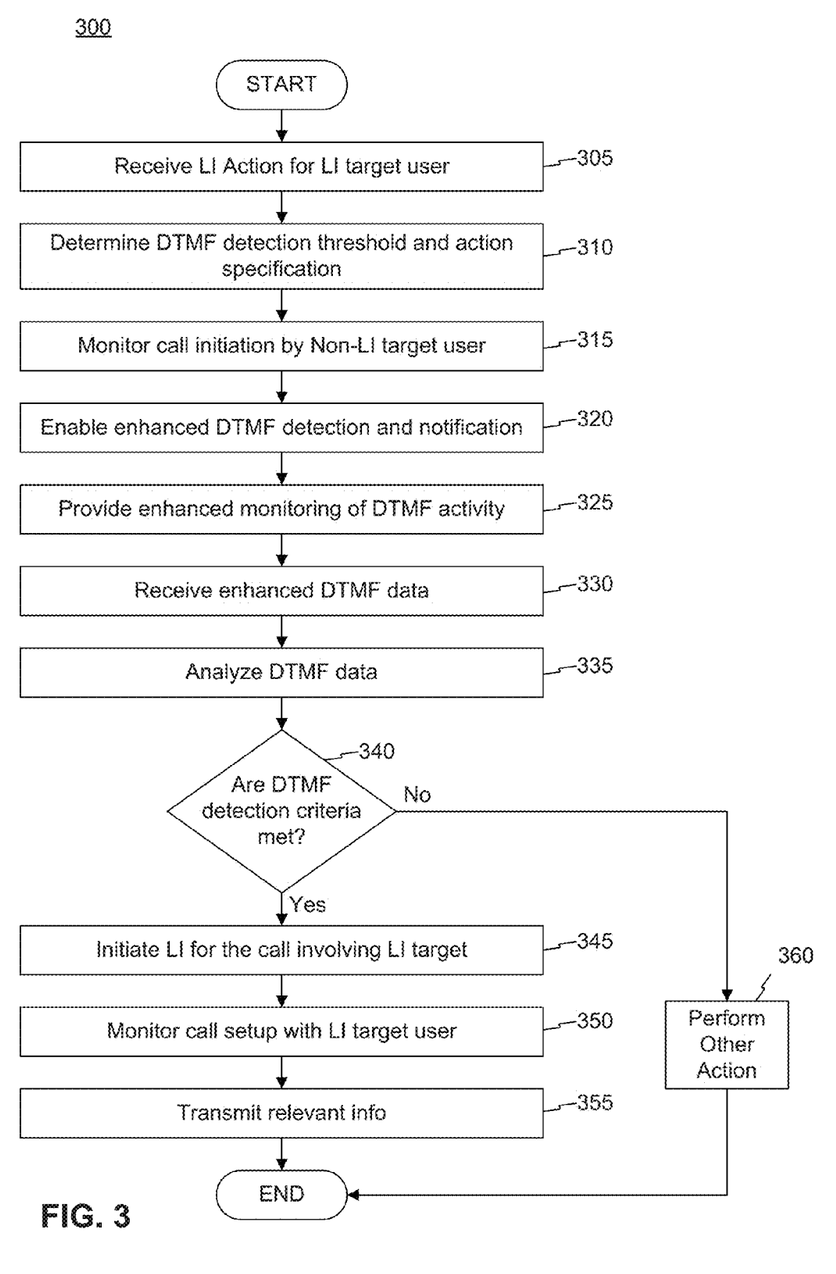
FIG. 3 is a flow diagram illustrating an in-band DTMF signaling interception process in accordance with some embodiments of the present disclosure.

FIG. 3 is a flow diagram illustrating an in-band DTMF signaling interception process in accordance with some embodiments of the present disclosure. Process 300 may be performed using various components of system 100 and system 200. While the process may be described as being performed by specific components, it may be understood that other components may be used to perform the same or equivalent functions.

Process 300 may begin at step 305. In step 305, LI provisioning system 112 may receive an LI action from LEA administrator 134 using a LEA interface (LEAI). The LI action may include an activation of a LI for a particular subscriber (e.g., a target user). The LI activation may allow interception for all calls involving service provider 110 or MGC 210 until the LI is deactivated. In other embodiments, the LI activation may include an activation period. For example, the LI action may indicate that the LI expires at a particular time.

In step 310, LEAI may provide specifications outlining how an LI should be implemented. Provisioning interface 212 may receive the specification and provide the information to DTMF analyzer 216. The LEAI may specify actions to be taken by MGC 210 based on the certainty of the DTMF digits resulting from DTMF analysis. For example, the specification may instruct particular actions for MGC 210 to perform when the certainty that a call involves an LI target falls below a predetermined threshold.

In an embodiment, the specifications provided by the LEAI may instruct system 200 to perform different actions for different levels of certainty. The LEAI may provide different threshold levels and a specific action based on the level of certainty exceeding the threshold. For example, table 1 below provides a list of example threshold certainty levels and corresponding actions.

TABLE 1

| Certainty Level | System Action |
| --- | --- |
| >90% | Initiate LI for call (e.g., record call; forward call media and signaling information to LEA). |
| 80-90% | Send signaling information (e.g., DTMF information, protocol messages) related to the call to the LEA; do not record call and send call media contents to LEA. |
| <80% | Do nothing (e.g., do not initiate LI at all for the call). |

In another embodiment, the LEAI may provide only a single threshold to the system 200 and instruct the system 200 to initiate LI only if the level of certainty exceeds the threshold, and do nothing otherwise. In another embodiment, the LEAI may not provide any thresholds at all to the system 200, and the system 200 initiates LI only if the level of certainty is 100%.

Additional actions may be defined by the LEAI. The LEAI may instruct system 200 to use an extended inter-digit timer when identifying called user digits. For example, the LEAI may state that, although a standard inter-digit timer times out at 2 seconds, to continue record DTMF digits up to an interval of 5 seconds. In another example, the LEAI may suspend the use of inter-digit timers altogether, analyzing DTMF values as an ongoing stream of digits. The LEAI may also specify individual MGWs of MGCs that should activate DTMF detection. The LEAI may also specify for which destinations/calls via the MGC, DTMF detection should be activated in the MGW controlled by the MGC.

In step 315, a call may be made by a user that is not a target user (e.g., a non-LI target user, "user Y"). User Y may place a call to a call proxy system (e.g., a pre-paid calling card server).

In step 320, system 200 may monitor call initiation by a non-LI target user. In an embodiment, DTMF analyzer 216 of MGC 210 (e.g., the local network) may instruct SEIS 218 to send a message to MGW 240 while a call is being setup by MGC 210 to enable enhanced DTMF and media path detection for all calls. The message from SEIS 218 may be received by SEIS 242. Based on the message from MGC 210, SEIS 242 may provide necessary information to IBSS 252 and VBS 258. IBSS 252 and VBS 258 may assign resources required to provide enhanced DTMF detection and media path detection. For example, IBSS 252 may be responsible for facilitating DTMF detection, and VBS 258 may enable media path detection.

IBSS 252 may monitor DTMF information in multiple formats. For example, DTMF signals may be transported in-band (e.g., in the media path) using in-band audio signals transported over a PSTN network. Other DTMF signal formats may include payload in RTP packets on a VoIP network (e.g., as defined in IEFT RFC 2833 and 4733), audio payload RTP packets in a VoIP network, and/or proprietary packet, audio, or signaling formats used in a local network and/or known by system 200.

In an embodiment, DTMF analyzer 216 may trigger the enabling of enhanced DTMF detection and/or media path detection independently of requests for DTMF detection, or a lack thereof, from LEA 130 or a remote side. For example, DTMF analyzer may ready sub-systems for forthcoming LI actions by pre-provisioning the necessary resources to provide requested LI services.

In an embodiment, call monitoring may be pre-screened based on specific callers and/or called numbers. System 200 may only monitor call initiation requests originating from specific user or direct to specific called numbers, such as, for example, number of known call proxy systems. The pre-screening process may reduce the processing load on system 200. Numbers of known call proxy systems or specific pre-determined callers may be sent by LEA 130 or LI provisioning system 264 to MGC 210.

In an embodiment, no media gateway may be controlled by MGC 210. In these instances, when the call proxy system or call proxy system's network are reported separately over the signaling path, DTMF analyzer 216 may instruct SEIS 218 (both of MGC 210) to send a request to a media gateway controller of a neighboring node on the signaling path. The request may call on the media gateway controller of a neighboring node to perform enhanced DTMF detection and notify MGC 210 of any DTMF information. An extended interface between MGC 210 and the media gateway controller of the neighboring node on the signaling path may facilitate the request and transmission of enhanced DTMF information.

In step 325, system 200 may provide enhanced monitoring of DTMF activity. IBSS 252 of MGW 240 may begin monitoring DTMF activity (e.g., based on instructions received in Step 320). IBSS 252 may, for example, capture requested information such as DTMF digits, inter-digit intervals, and/or groups of digits. VBS 258 may begin monitoring and capturing relevant information on the media path. For example, VBS 258 may capture in-band audio during digit dialing, such as tones and announcements. IBSS 252 and VBS 258 may coordinate monitoring processes.

In an embodiment, no media gateway may be controlled by MGC 210. In these instances, the monitoring process may be performed by a media gateway of a neighboring node. For example, other media gateways may include an in-band signaling sub-system and voice band sub-system like MGW 240. These sub-systems of a neighboring node may receive instructions from SEIS 218 to perform step 325.

In step 330, system 200 may receive enhanced DTMF data. In an embodiment, a calling user may dial a target user's number (e.g., an identifier of an LI target) after an in-band prompt or announcement from a call proxy system. The dialing may produce DTMF tones. IBSS 252 and VBS 258 may capture these DTMF tones, along with related information such as inter-digit intervals. Additional announcements or prompts may be played in the media path as the calling user interacts with the call proxy system. VBS 258 may record audio and information transmitted over the media path. SEIS 242 may receive all information gathered by IBSS 252 and VBS 258, including, for example, the DTMF digits, audio of any announcements, and inter-digit intervals. SEIS 242 may aggregate and forward the information to MGC 210 by way of SEIS 218. For example, SEIS 242 may send an H.248 NOTIFY message to SEIS 218.

In an embodiment, SEIS 242 may report additional information. For example, SEIS 242 may report network congestion levels on the media path and/or whether there was any RTP activity during dialing of the DTMF digits to a call proxy system. Additional information may be used to more precisely determine whether a call is being placed to a target user using the call proxy system. To report this additional information, SEIS 242 may use a modified interface. For example, SEIS 242 may use an extended H.248 interface between MGW 240 and MGC 210 to report this additional information.

In an embodiment, no media gateway may be controlled by MGC 210. In these instances, the neighboring media gateway and neighboring media gateway controller may be responsible for triggering monitoring of DTMF information and reporting DTMF information to MGC 210. An enhanced interface between MGC 210 and a neighboring node may facilitate the transmission of captured DTMF information. For example, an enhanced SIP INFO message may be used by the neighboring node when SIP is used by both media gateway controllers.

In step 335, system 200 may analyze DTMF data. DTMF analyzer 216 may receive DTMF information from SEIS 218 as gathered by IBSS 252 and VBS 258 (step 330). DTMF analyzer 216 may use the DTMF information to determine whether a target user has been dialed. In an embodiment, DTMF analyzer 216 may process DTMF digits, inter-digit intervals, the presence (or lack thereof) of any RTP activity during digit dialing, and/or the sequence of events to determine if the call involves a target user. For example, DTMF analyzer 216 may determine that seven DTMF digits were dialed in series with minimal inter-digit intervals to form a series of numbers match the phone number of a target user.

In an embodiment, DTMF analyzer 216 may alter the DTMF analysis process based on situational information. DTMF analyzer 216 may adjust the threshold limits provisioned by LEA 130 based on factors affecting call signaling. For example, DTMF analyzer 216 may utilize factors, such as whether the call is connected directly to MGC 210, a neighboring media gateway controller, a switch in a PSTN network, or a switch or proxy in a VoIP network; the proximity (e.g., physical distance) between the call and MGW 240; the congestion level of the network over which media information is transmitted (e.g., causing a delay in packet transmission); and/or the proximity (e.g., physical distance) of the call proxy system to MGW 240. These factors may influence the delay for tones or announcements from the call proxy system to the calling user. The direct connection of the caller and network congestion may influence delay in the DTMF digits from the calling user reaching MGW 240. The direct connection of the calling user also influence delays due to processing in intermediate switches, which network congestion and call proxy system proximity may influence transmission delay. Finally, network congestion may influence different inter-digit intervals of DTMF signals even though the DTMF digits were dialed within a specified time interval.

In an embodiment, no media gateway may be controlled by MGC 210. In these instances, DTMF analyzer 216 utilizes the DTMF information aggregated by and received from a neighboring media gateway controller. In this example, the connection between the neighboring media gateway controller and MGC 210 (e.g., physical distance, network congestion) may also be a factor influencing the analysis of DTMF analyzer 216.

In step 340, system 200 may determine whether DTMF detection criteria are met. In an embodiment, DTMF analyzer 216 may decide whether the call involves a target user. For example, DTMF analyzer 216 may determine with 100% certainty that the DTMF information corresponds to a target user.

In an embodiment, alternative criteria may be used. For example, rather than using a score of 100% certainty, a score of 90% or greater may be high enough to initiate an LI. In another criteria scheme, the criteria may include fractional matching. For example, the DTMF tones may only need to match eight of the ten digits of a target users phone number (e.g., detected DTMF tones "202-555-198" may be deemed to match target identifier "202-555-1989"). Additional criteria schemes may be used consistent with this disclosure. Various criteria may be combined in a single test. For example, certainty of individual digits may be used with the need to only match eight digits with 90% certainty.

Regardless of the DTMF criteria used, should they not be met (e.g., step 340, no), process 300 may proceed to step 360. In step 360, system 200 may perform other actions. These actions may not include initiating an LI for the call. The actions may include cataloging the DTMF analysis results.

In an embodiment, LEA 130 may send instructions for partial matches of DTMF data. The instructions provided by LEA 130 may include specific instructions describing alternative (e.g., non-LI initiation) actions based on partial criteria matches. For example, should a certainty score of 80-90% result, MGC 210 may forward DTMF information as well as information exchanged for the call on the signaling plane (e.g., signaling information or information used by DTMF analyzer 216) over an X2 interface. After step 360 is complete, process 300 may end.

When DTMF analysis criteria are met (e.g., step 340, yes), process 300 may proceed to step 345. In step 345, system 200 may initiate an LI for a call involving an LI target. In an embodiment, DTMF analyzer 216 may instruct LI sub-system 214 to initiate LI for the call. LI sub-system 214 may initiate LI for a call. For example, LI sub-system 214 may record the audio for a call. LI sub-system 214 may capture additional information exchanged during the call such as signaling information and in-band data as part of the LI. When the call involves video, such as in video conferencing, LI sub-system 214 may include the capability to capture the video exchanged during the conference. The LI action may describe whether video and/or images should be captured from video conferences.

In step 350, system 200 may monitor the call proxy system call setup with an LI target user. System 200 may confirm that the call has connected to a user using the call proxy system. In an embodiment, system 200 may continue to monitor in-band signaling to further verify that the call is being placed to a target user.

In step 355, system 200 may transmit relevant LI information to LEA 130. DTMF analyzer 216 may provide all call information to LI sub-system 214. LI sub-system 214 may convert the information as necessary to be understood by LI gateway 118, and transmit the information to LI gateway 118. LI gateway 118 may transcode and provide the LI information to LEMF 136. After step 355, process 300 may end.

In an embodiment, process 300 may be applied to instances where the calling user is the target user. For example, system 200 may know based on standard call initiation signaling message that the caller initiating the call is a target user. However, the target user may call a call proxy system which could mask the called user. System 200 and the steps of process 300 may be adapted and used to determine the called user in these situations. For example, DTMF analyzer 216 may be used to analyze DTMF information generated by the target user's call to a call proxy system. But, in these instances, there is no need to make a determination whether the LI should be initiated (e.g., step 340) because system 200 already knows that a target user is involved in the call because of the call initiation signaling. However, the DTMF analyzer 216 may provide the DTMF information to the LI subsystem 214, and this information is then sent by the LI sub-system 214 (after converting the information as necessary to be understood by LI gateway 118) to LI gateway 118.

Figure 4:
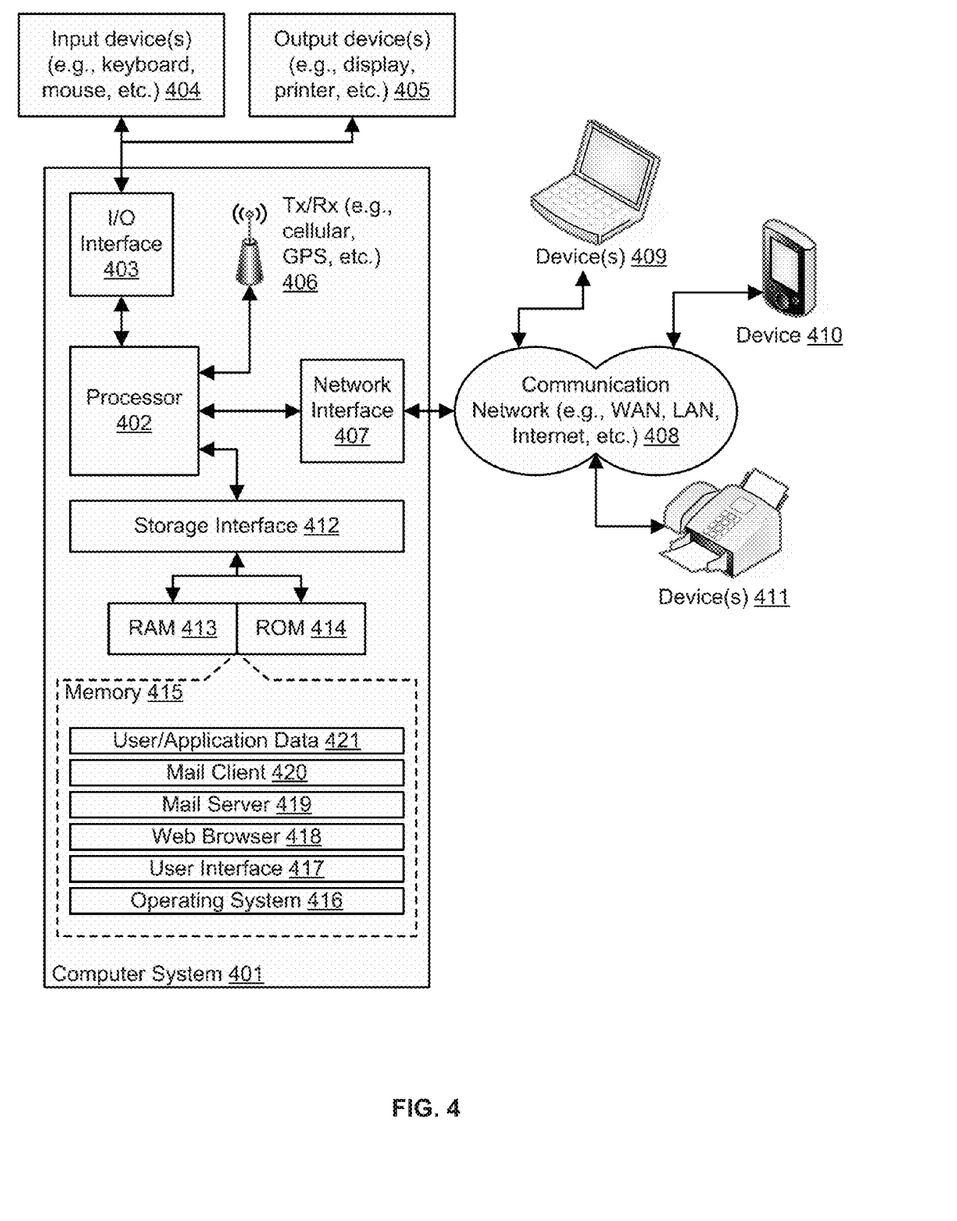
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing LI provisioning system 112 LEA administrator 134, LEMF 136, MGW provisioning system 262, LI provisioning system 264, soft switch provisioning system 266, LI gateway 268, MGC 210, and MGW 240. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, LEMF 136, service provider 110, MGC 210, and MGW 240.

The memory devices may store a collection of program or database components, including, without limitation, an operating system 416, user interface 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., contact information, LI data, DTMF data, recorded call data, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described systems and methods for improved lawful interceptions for calls involving in-band DTMF signaling. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for implementing in-band dual-tone multi-frequency call interception, comprising:
   receiving a call intercept request for a target user number at a lawful interception provisioning system;
   initiating, by one or more processors, call monitoring of a call from a calling user to a call proxy system to capture in-band dual-tone multi-frequency signaling; and
   determining whether the dual-tone multi-frequency signaling corresponds to the target user number;
   wherein determining whether the dual-tone multi-frequency signaling corresponds to the target user number is based on at least one of: an inter-digit interval, an interval between a tone and the start of the dual-tone multi-frequency signal, tones of the dual-tone multi-frequency signaling, or whether any real-time transport protocol packets are exchanged between one or more digit tones;
      wherein the inter-digit interval and the interval between the tone and the start of the dual-tone multi-frequency signaling is dynamically adapted based on at least one of: a distance of the calling user from a media gateway, a distance of the call proxy system from the media gateway, and a congestion level of a path in a network over which media content for the call is transported.

2. The method of claim 1, further comprising:
   initiating lawful interception for the call, after determining that the dual-tone multi-frequency signaling corresponds to the target user number.

3. The method of claim 1, further comprising:
   determining whether the call is being initiated to the target user number, after determining that the dual-tone multi-frequency signaling corresponds to the target user number.

4. The method of claim 1, wherein:
   the call intercept request is by a law enforcement agency.

5. The method of claim 1, wherein:
   the dual-tone multi-frequency signaling includes in-band audio signals on a public switched telephone network or a public land mobile network.

6. The method of claim 1, wherein:
   the dual-tone multi-frequency signaling is at least one of an audio signal in a packet payload or specific dual-tone multi-frequency coding in real-time packet protocol packets.

7. A method for implementing in-band dual-tone multi-frequency call interception, comprising:
   receiving a call intercept request for a target user number at a lawful interception provisioning system;
   initiating, by one or more processors, call monitoring of a call from a calling user to a call proxy system to capture in-band dual-tone multi-frequency signaling;
   determining whether the dual-tone multi-frequency signaling corresponds to the target user number;
   determining a confidence level for a match between the in-band dual-tone multi-frequency signaling and the target user number; and
   determining that the in-band dual-tone multi-frequency signaling includes the target user number comprises determining that the confidence level exceeds a first predefined threshold.

8. The method of claim 7, wherein:
   when the confidence level does not exceed the first predefined threshold and does exceed a second predefined threshold, initiating communication of signaling information, but not media content, and not initiating call recording for the call, and the first predefined threshold corresponds to a higher confidence level than the second predefined threshold.

9. The method of claim 8, wherein:
   when the confidence level exceeds the first predefined threshold, initiating communication of signaling information and media content, and initiating call recording for the call.

10. The method of claim 9, wherein:
    the confidence level is based on the in-band dual-tone multi-frequency signaling and call history data for at least one of: the calling user and a called user.

11. A method for implementing in-band dual-tone multi-frequency call interception, comprising:
    receiving a call intercept request for a target user number at a lawful interception provisioning system;
    sending, by one or more processors, to a neighboring media gateway controller, a request for call monitoring of a call from a calling user to a call proxy system to capture in-band dual-tone multi-frequency signaling;
    receiving, by the one or more processors, from the neighboring media gateway controller, the in-band multi-frequency signaling; and
    determining whether the dual-tone multi-frequency signaling corresponds to the target user number;

wherein determining whether the dual-tone multi-frequency signaling corresponds to the target user number is based on at least one of: an inter-digit interval, an interval between a tone and the start of the dual-tone multi-frequency signal, tones of the dual-tone multi-frequency signaling, or whether any real-time transport protocol packets are exchanged between one or more digit tones:
   wherein the inter-digit interval and the interval between the tone and the start of the dual-tone multi-frequency signaling is dynamically adapted based on at least one of: a distance of the calling user from a media gateway, a distance of the call proxy system from the media gateway, and a congestion level of a path in a network over which media content for the call is transported.

12. The method of claim 11, further comprising:
initiating lawful interception for the call, after determining that the dual-tone multi-frequency signaling corresponds to the target user number.

13. The method of claim 11, wherein:
the in-band dual-tone multi-frequency signaling is received over an extended interface.

14. The method of claim 13, wherein:
the in-band dual-tone multi-frequency signaling is received in an enhanced Signal Initiation Protocol INFO message.

15. The method of claim 11, wherein:
the neighboring media gateway controller is a neighboring node on the signal path.

16. The method of claim 11, further comprising:
responsive to determining that the dual-tone multi-frequency signaling includes the target user number, determining whether the call is being initiated to the target user number.

17. The method of claim 16, wherein:
the call intercept request is an interception from a law enforcement agency.

\* \* \* \* \*